May 5, 1925.
D. F. DOMIZI
1,536,824
REAR AXLE CENTER
Filed March 19, 1923
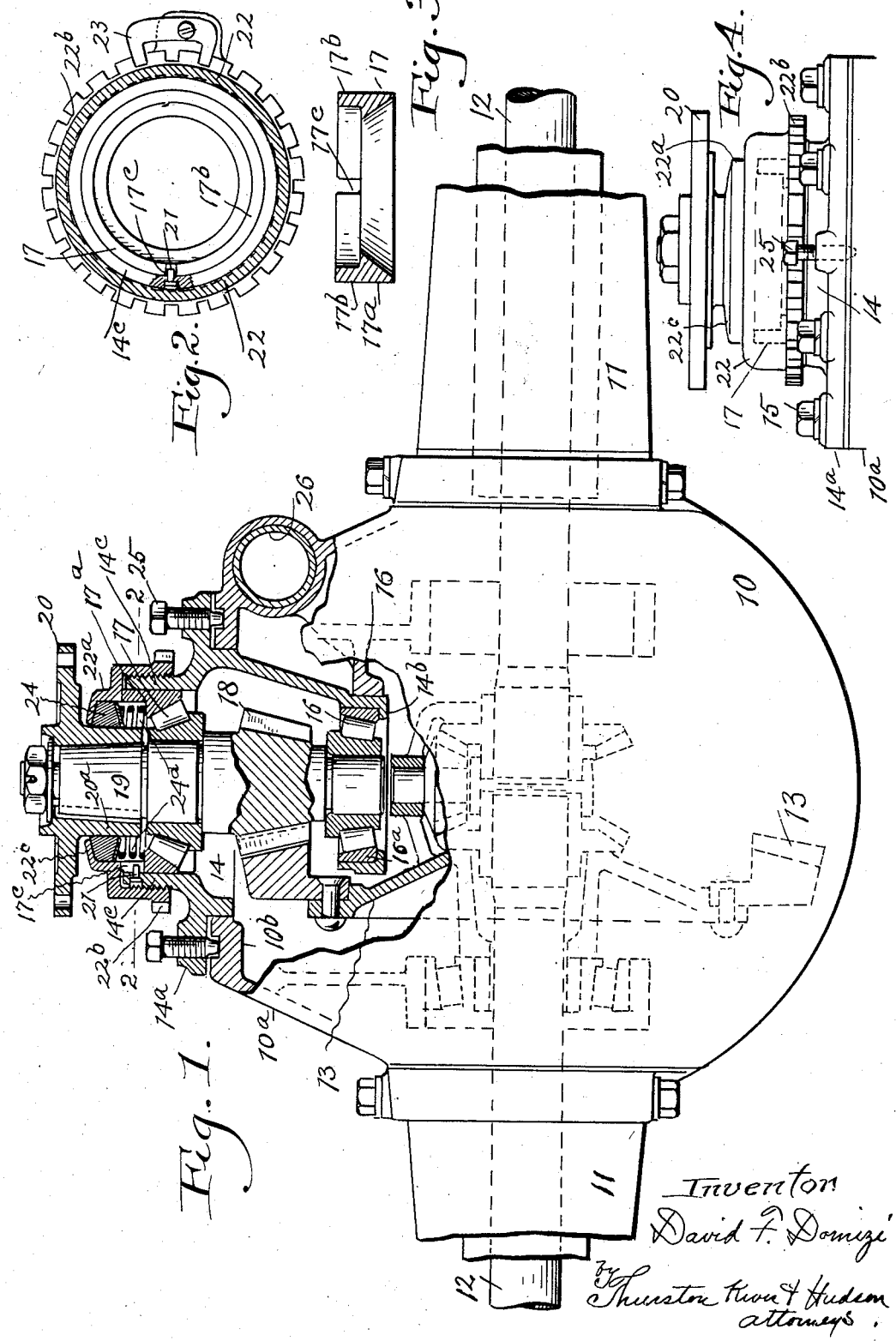

Patented May 5, 1925.

1,536,824

UNITED STATES PATENT OFFICE.

DAVID F. DOMIZI, OF CLEVELAND, OHIO.

REAR-AXLE CENTER.

Application filed March 19, 1923. Serial No. 626,072.

*To all whom it may concern:*

Be it known that I, DAVID F. DOMIZI, a citizen of the United States, residing at Cleveland, in the county of Cuyahoga and State of Ohio, have invented a certain new and useful Improvement in Rear-Axle Centers, of which the following is a full, clear, and exact description.

This invention relates to a rear axle or so-called rear axle center for motor vehicles, and has particular reference to certain improvements pertaining to the support for the driving pinion.

One of the objects of the present invention is to provide a construction wherein the driving pinion has two bearings, the outer of which is located as close as possible to the coupling flange or other means by which the pinion, or rather its stub shaft, is secured to the propeller shaft, while at the same time providing means for adjusting the outer bearing without disturbing the alignment of the bearings.

A further object is to provide a construction wherein there is attained to a marked degree the feature of compactness and rigidity, and also to provide a construction which is highly desirable from a manufacturing standpoint.

Still further the invention aims to provide a construction wherein a nut utilized in adjusting the outer pinion bearing is arranged on the outer side of the bearing retainer, thus making it possible to reduce the space between the bearing and the coupling flange.

Still further, the invention aims to provide certain improvements wherein this outer nut used in adjusting the bearing may be employed as a stuffing box gland.

The above and other objects are attained by my invention, which may be briefly summarized as consisting in certain novel details of construction and combinations and arrangements of parts which will be described in the specification and set forth in the appended claims.

In the accompanying sheet of drawings, Fig. 1 is a plan view of the axle center with parts in section; Fig. 2 is a cross sectional view substantially along the line 2—2 of Fig. 1; Fig. 3 shows a bearing sleeve preferably embodied in the construction; and Fig. 4 is a fragmentary elevation of a portion of the axle center or rather the extension in which the pinion is supported.

Referring now to the drawings, 10 represents the axle housing having the usual axle tubes 11, through which extend the live axles 12. The housing 10 encloses the differential mechanism, the details of which are immaterial to my invention, but which usually involves a large bevel gear 13.

The housing has a forward extension or neck $10^a$ and secured to the flanged forward end $10^b$ thereof is a bearing retainer 14 having an outer flanged portion $14^a$ which is secured by an annular series of bolts 15 to the flanged front end of the housing extension $10^a$. This bearing retainer carries two bearings 16 and 17, in this instance combined end thrust and radial bearings, which bearings support the driving pinion 18 and its shaft or stub shaft 19, which is designed to be connected to the engine driven propeller shaft, in this instance by a coupling flange 20 of a sleeve which is keyed onto the tapered forward end of the pinion shaft 19.

The bearings 16 and 17 are on opposite sides of the pinion 18, the bearing 16 being the inner bearing and the bearing 17 being the outer bearing. Both bearings, as here shown are of the ring and roller type, but as far as certain features of my invention are concerned they might as well be of the ring and ball type or any other suitable type.

The inner bearing 16 has an outer sleeve or ring $16^a$ which is fitted tightly into a cup or socket $14^b$ at the inner end of the retainer 14. The outer bearing 17 has an outer sleeve or ring $17^a$, a detail of which is shown in Fig. 3, this sleeve fitting into an outer cylindrical part $14^c$ of the retainer 14, and being adjustable therein.

This sleeve $17^a$, and therefore the entire outer bearing, is designed to be adjusted axially, preferably by an adjusting nut, and in order that the alignment of the bearings may not be disturbed when the adjustment is made, it is desirable that the sleeve $17^a$ be held from turning. This is brought about by providing the sleeve $17^a$ at one end with an annular extension $17^b$, which extension is adapted to be engaged by the adjusting nut, as will be subsequently explained, and in order that the sleeve may be held from turning as it is adjusted, the extension $17^b$ of the sleeve is provided with a slot $17^c$, which is engaged by a pin 21 which extends through the cylindrical portion $14^c$ of the retainer into this slot. This feature just explained is not broadly claimed herein, but constitutes an important feature of my invention disclosed and claimed in a copending application filed by me November 27, 1922, Serial No. 603,491.

In my co-pending application referred to, the outer bearing is adapted to be adjusted by a nut which is screwed into the bearing retainer, and is adapted to bear against the extension of the outer bearing sleeve. However, in a construction such as herein disclosed wherein the stub shaft of the pinion is designed to be coupled to the propeller shaft, it is highly desirable that the outer bearing 17 be arranged as near as possible to the coupling flange. But the screwing of the nut inside the retainer for the purpose of adjusting the outer bearing would not admit of the closest possible arrangement of the outer bearing and coupling flange. I therefore provide the present improved construction involving the following novel features.

For the purpose of adjusting the outer bearing 17 I utilize a nut 22 having a body portion which is arranged externally of the retainer and screws onto the outside of the latter instead of in the latter, as heretofore. This nut has an end portion $22^a$ which extends inwardly beyond the extreme forward end of the retainer, and bears against the end of the annular flange $17^b$ of the bearing sleeve $17^a$ of the outer bearing 17. In other words, instead of arranging the adjusting nut inside of the bearing retainer at the end of the bearing 17, it is arranged outside of the retainer to admit of the close spacing of the bearing with the coupling flange, but nevertheless it bears against the outer end of the outer bearing sleeve (the latter projecting slightly beyond the end of the retainer) so that when the nut is turned the bearing itself will be adjusted.

The nut may be locked in adjusted position in any suitable way, but in this instance it is provided at its rear end with a toothed flange $22^b$, designed to be engaged by any suitable holding device 23, which may be mounted on the retainer 14.

Not only does this construction have the advantages above enumerated, but by extending the end of the nut inwardly as herein disclosed, the nut may serve also as a stuffing box gland to prevent the loss of lubricant. To bring about this result the end $22^a$ of the nut is extended inwardly beyond that portion which bears on the outer bearing sleeve $17^a$, as shown at $22^c$, this part extending in close proximity to the sleeve $20^a$ of the coupling 20 which fits onto and is keyed to the end of the pinion shaft 19. Inside the nut and between the end $22^c$ and the bearing 17 suitable packing 24 is provided, which packing is in this instance pressed outwardly or toward the extreme end of the nut by a coiled spring $24^a$.

As already stated, the bearing retainer 14 is secured to the end of the housing extension $10^a$ by an annular series of bolts 15, but inasmuch as the retainer has an annular part or shoulder which fits inside of the flanged forward end $10^b$ of the housing extension $10^a$, and inasmuch as it is sometimes desirable to force the retainer away from and out of the housing extension into which it normally fits, I have provided means somewhat similar to that shown in my prior application for doing this in a convenient manner and without the necessity of prying the retainer out of the housing extension. This is accomplished by providing at diametrically opposite points in the flange $14^a$ of the retainer a pair of jack screws 25, which are threaded into the flange of the retainer and bear against the inwardly extending flange $10^b$ at the end of the housing extension $10^a$, the ends of these jack screws being preferably received in cup-like depressions of the housing extension. It will be seen, therefore, that it is only necessary to screw in these jack screws to force the retainer out of the housing extension, it being assumed of course, that the bolts 15 are first removed.

In my prior application referred to, the propeller shaft is surrounded by a torque tube, but the present construction does not contemplate a torque tube, but a torque arm whose rear end is designed to be fitted, in the well-known manner, in a socket 26 of the housing extension $10^a$, while its forward end is designed to be pivotally or otherwise connected in any of the well-known ways to the chassis frame.

Having described my invention, I claim:

1. In a rear axle construction, an axle housing adapted to contain a differential, a driving pinion, two bearings for the pinion located on opposite sides thereof, a retainer supporting said bearings, the outer bearing being slidably mounted in the retainer, and a nut arranged externally of the retainer and engaging the outer bearing for adjusting the same.

2. In a rear axle construction, an axle housing adapted to contain a differential, a bearing retainer secured to the housing, a driving pinion, a pair of bearings arranged on opposite sides of the pinion and supported by the bearing retainer, the outer bearing comprising a bearing sleeve slidable within the retainer, and a member surrounding the retainer and engaging the said bearing sleeve for adjusting the outer bearing.

3. In a rear axle construction, an axle housing adapted to contain differential mechanism, a driving pinion having a stub shaft adapted to be connected to a propeller shaft, a pair of pinion supporting bearings arranged on opposite sides of the pinion, a bearing retainer supporting said bearings and secured to a part of the housing, the outer bearing comprising a bearing sleeve slidable within the retainer, and a combined stuffing box gland and nut for adjusting the outer bearing carried by the end of the retainer.

4. In a rear axle construction, an axle housing adapted to contain differential mechanism, a driving pinion having a stub shaft adapted to be connected to a propeller shaft, a pair of pinion supporting bearings arranged on opposite sides of the pinion, a bearing retainer supporting said bearings and secured to a part of the housing, the outer bearing comprising a bearing sleeve slidable within the retainer, and a combined stuffing box gland and nut for adjusting the outer bearing carried by the end of the retainer, said nut being screwed onto the outside of said retainer.

5. In a rear axle construction, an axle housing containing differential mechanism, a driving pinion having a stub shaft provided with a coupling by which the pinion may be connected to the propeller shaft, two bearings for supporting the pinion and arranged one inwardly and the other outwardly of the pinion, a bearing retainer in which said bearings are mounted, the outer bearing comprising an outer sleeve slidably but non-rotatably mounted within the retainer, and a nut screwed on the outside of the said retainer and engaging said outer sleeve, whereby by adjusting said nut the outer bearing may be adjusted and said outer bearing may be located adjacent said coupling.

6. In a rear axle construction, an axle housing adapted to contain a differential, a driving pinion for operating the differential, said pinion having a stub shaft adapted to be connected to a propeller shaft, a bearing arranged outwardly of the pinion, a bearing retainer connected to the housing and supporting said outer bearing, said outer bearing having an outer sleeve slidably and non-rotatably supported by the retainer and projecting beyond the end thereof, and a bearing adjusting nut rotatably mounted on the outside of the retainer and extending inwardly in engagement with said outer sleeve.

7. In a rear axle construction, an axle housing adapted to contain a differential, a driving pinion for operating the differential, said pinion having a stub shaft adapted to be connected to a propeller shaft, a bearing arranged outwardly of the pinion, a bearing retainer connected to the housing and supporting said outer bearing, said outer bearing having an outer sleeve slidably and non-rotatably supported by the retainer and projecting beyond the end thereof, and a bearing adjusting nut rotatably mounted on the outside of the retainer and extending inwardly in engagement with said outer sleeve, the end of the nut being extended inwardly and serving to retain packing between said end of the nut and the bearings.

In testimony whereof, I hereunto affix my signature.

DAVID F. DOMIZI.